(No Model.)  3 Sheets—Sheet 1.

R. M. DIXON.
COCK.

No. 543,646.  Patented July 30, 1895.

Witnesses
C. S. Frye
G. T. Myers

Inventor
R. M. Dixon
By Joseph W. Kiesewetter Adams
Attorney (No Model.) 3 Sheets—Sheet 2.
R. M. DIXON.
COCK.

No. 543,646. Patented July 30, 1895.

Witnesses
C. S. Frye
G. F. Myers

Inventor
R. M. Dixon
By Joseph K. Kiester Atkins
Attorney

United States Patent Office.

ROBERT MUNN DIXON, OF EAST ORANGE, NEW JERSEY, ASSIGNOR TO THE SAFETY CAR HEATING AND LIGHTING COMPANY, OF NEW YORK, N. Y.

COCK.

SPECIFICATION forming part of Letters Patent No. 543,646, dated July 30, 1895.

Application filed April 20, 1893. Serial No. 471,206. (No model.)

*To all whom it may concern:*

Be it known that I, ROBERT MUNN DIXON, of East Orange, county of Essex, State of New Jersey, have invented certain new and useful Improvements in Cocks, of which the following is a specification, reference being had to the accompanying drawings.

The object of my invention is to produce an improved cock particularly designed for use in car-heating systems, as shown, for example, in my application, Serial No. 449,267, filed October 18, 1892.

Figure 1:
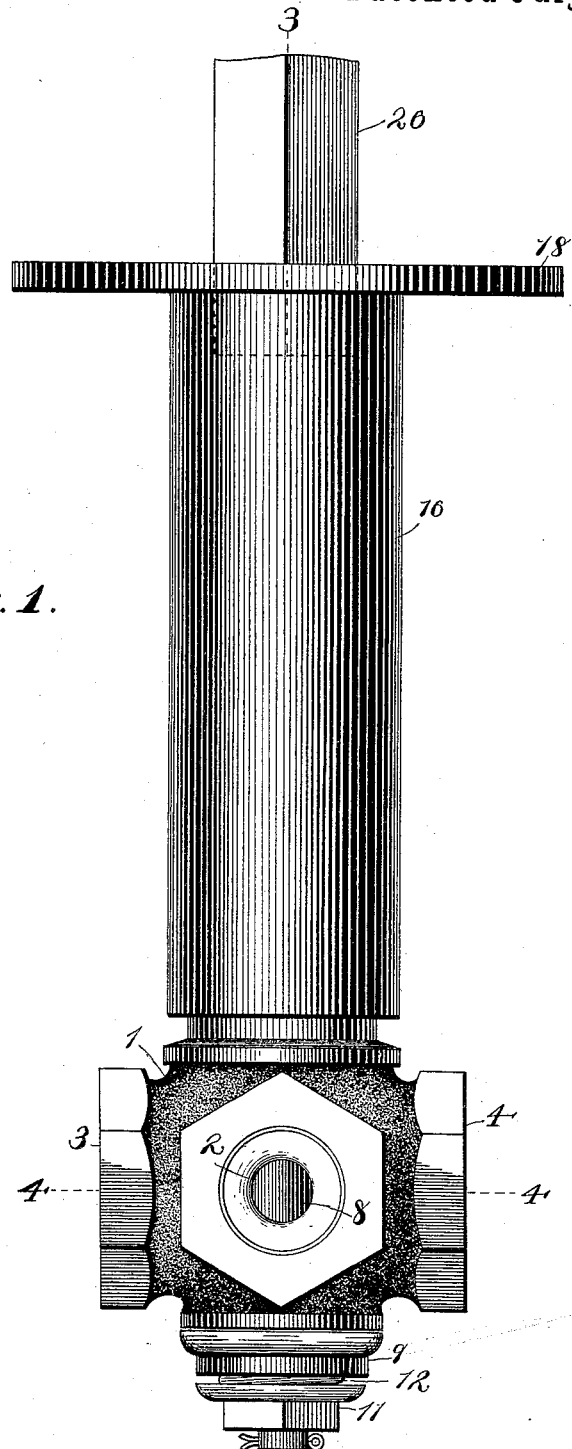
Figure 2:
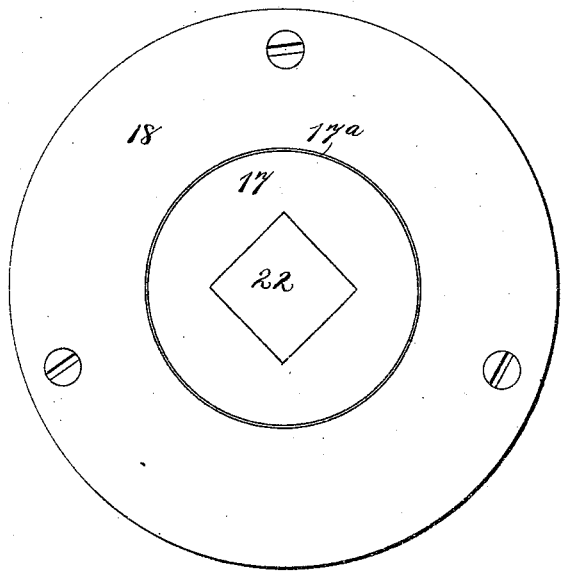
Figure 4:
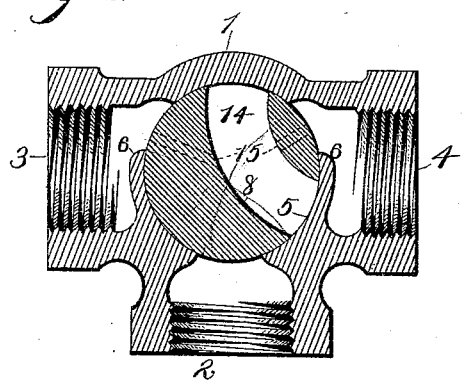
Figure 3:
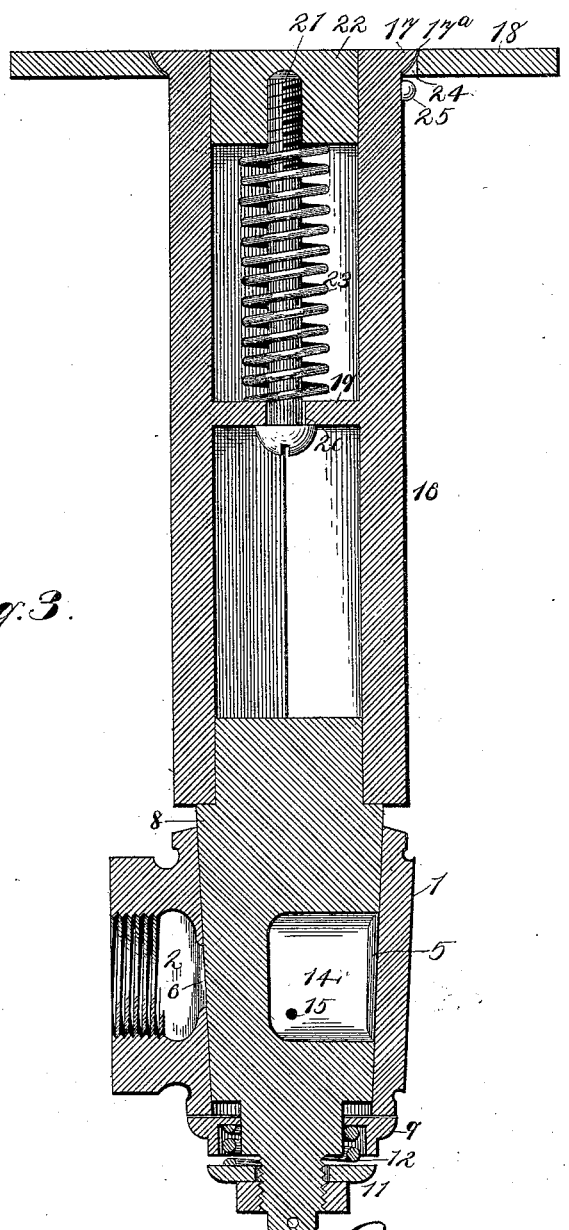

In the accompanying drawings, Figure 1 is a side elevation of the cock with shank attached and tool inserted. Fig. 2 is a top plan view thereof. Fig. 3 is a central vertical section on the line 3 3 of Fig. 1. Fig. 4 is a similar view on the line 4 4 of Fig. 1.

Referring to the figures on the drawings, 1 indicates a casing having three ports 2, 3, and 4, communicating with a central chamber 5 through passages defined by bearing-faces 6. The central chamber is preferably tapered and fitted tightly to a plug 8. The plug is preferably provided with a reduced end adapted to pass through a box 9 in the end of the casing, the box and plug being preferably secured thereto by a nut 11 pressing against a yielding spring 12, seated in the box and against the bottom of the nut. The nut is preferably retained in place by a cotter-key. The plug is provided with a longitudinally-elongated curved chamber 14, which is adapted to make between any two of the three ports a passage-way or to close them all.

15 indicates a drill-channel through the plug, adapted, when the plug is set in the position shown in Fig. 3 of the drawings, to allow the passage of a small quantity of steam between the ports 3 and 4. The head of the plug is preferably squared to receive the squared end of a shank 16, which is, as suggested, preferably made separate from the plug itself. The upper end of this shank is designed to be flush with the surface of the floor (a car-floor, for example) to which it is attached. It therefore has an enlarged annular head 17, which moves in and completely closes a circular opening 17ª in walls of corresponding shape in the top of a floor-plate 18. The shank has, near its middle part, a diaphragm 19, having an orifice 20, through which is passed a screw-bolt 21, screwed at its upper end into a squared plug 22. A spring 23, seated at one end against the diaphragm and at the upper end against the squared plug, serves to keep the plug flush with the surface of the floor-plate. The head of the nut limits the upward movement of the squared plug, which may be adjusted by screwing the screw-bolt into or out of the plug.

It will be observed that by the construction and relative arrangement of parts described the surfaces of the floor-plate, shank, and yielding plug are normally flush with each other, eliminating the dangerous and unsightly projections upon or depressions in the car-floor heretofore incident to the use of cocks beneath the floor adapted to be operated from within the car.

A recess 24 is preferably provided in one side of the opening in the floor-plate, through which a lug 25 may be inserted, and which, when turned away from the recess, affords sufficient fastening mechanism for keeping the shank in place.

For operating the cock-plug under conditions stated, a square-headed tool 26 is employed, and the squared end of the tool, which is made to fit the squared opening in the shank, is thrust, against the opposition of the spring, into the shank. In so doing the squared plug is depressed into the shank and leaves room for the tool-head. When the tool-head is in place, the shank may be turned by the rotation of the tool. Upon the withdrawal of the tool the squared plug returns to its former position and affords a smooth finish for the end of the shank.

I do not confine myself to the details of construction herein shown and described. For example, I may use the shank illustrated for the operation of cocks of other descriptions. The particular arrangement of the cock illustrated may also be varied without departing from the scope of my invention.

I wish to reserve the right to modify and vary the construction and arrangement of parts at will within the scope of my invention.

What I claim is—

1. In a cock shank or stem, the combination with the revoluble hollow part having a diaphragm therein, an opening in the diaphragm, a plug, a screw bolt passing through the opening in the diaphragm and into the plug, and a spring between the plug and diaphragm, all co-operating substantially as and for the purpose specified.

2. The combination with a cock, of a revoluble shank or stem recessed and provided with a spring actuated plug and annular head, of an apertured floor plate, a recess 24 in said floor plate, and a lug 25 on the shank adapted to co-operate therewith, substantially as specified.

In testimony of all which I have hereunto subscribed my name.

ROBERT MUNN DIXON.

Witnesses:
ELMER E. ALLBER,
CLARENCE D. SLOCUM.